United States Patent

[11] 3,615,609

[72] Inventors Douglas James Fry;
Geoffrey Ernest Ficken; Ronald William Burrows; Simon Lindsay Scrutton, all of Ilford, England
[21] Appl. No. 578,481
[22] Filed Sept. 12, 1966
[45] Patented Oct. 26, 1971
[73] Assignee Ilford Limited
Ilford, Essex, England
[32] Priority Sept. 23, 1965
[33] Great Britain
[31] 40620/65

[54] SUPERSENSITISING DYES
12 Claims, No Drawings

[52] U.S. Cl. .................................................. 96/104
[51] Int. Cl. .................................................. G03c 1/28
[50] Field of Search ......................................... 96/104

[56] References Cited
UNITED STATES PATENTS
2,704,720  3/1955  Jones ............................ 96/104
FOREIGN PATENTS
734,370  5/1966  Canada ....................... 96/104
1,232,821  1/1967  Germany .................... 96/104

*Primary Examiner*—Norman G. Torchin
*Assistant Examiner*—Mary F. Kelley
*Attorney*—Cushman, Darby & Cushman

ABSTRACT: Photographic silver halide emulsions containing a supersensitizing combination comprising a dye of the formula:

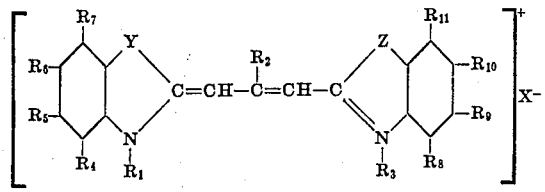

where Y and Z are selected from the class consisting of sulfur and selenium, at least one of the groups $R_1$ and $R_3$ are alkyl, the other groups being selected from the class consisting of alkyl, carboxyalkyl, carbamoylalkyl and sulphoalkyl, $R_2$ is selected from the class consisting of hydrogen and alkyl, at least one of the groups $R_5$ and $R_9$ is a thienyl group, the other groups $R_5$ and $R_9$ being selected from the class consisting of hydrogen, halogen, alkyl, aryl, hydroxy and alkoxy groups and together with either $R_4$ or $R_8$, depending on whether $R_5$ or $R_9$ carries the thienyl substituent group form part of a benzene ring, $R_4$ and $R_8$ taken separately each represent a hydroxy atom, $R_6$ and $R_{10}$ taken separately are each selected from the class consisting of a hydrogen atom, a halogen atom, an alkyl, aryl, hydroxy and alkoxy groups, $R_7$ and $R_{11}$ taken separately each represent a hydrogen atom, $R_6$ and $R_7$ taken together form part of a benzene ring, $R_{10}$ and $R_{11}$ taken together form part of a benzene ring and X is an anion, together with a dye of the formula:

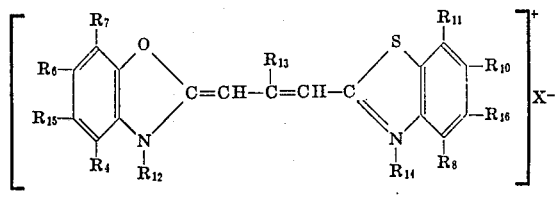

where $R_4$, $R_6$, $R_7$, $R_8$, $R_{10}$, $R_{11}$ and X have the meanings assigned to them above, $R_{12}$ is an alkyl group, $R_{13}$ is selected from the same class consisting of hydrogen and alky, $R_{14}$ is selected from the class consisting of an alkyl group and a group A-Q where A is selected from the class consisting of straight and branched alkylene chains containing 1 to 6 carbon atoms and Q is selected from the class consisting of an amide, a carbonyl, and a sulfonic acid group, $R_{15}$ and $R_{16}$ are each selected from hydrogen, halogen, alkyl, aryl, alkoxy and hydroxy groups. A third dye may also be used in the combination.

SUPERSENSITISING DYES

This invention relates to photographic light-sensitive materials and more particularly to the manufacture of dye-sensitized photographic silver handle emulsions.

Photographic silver halide emulsions have a certain natural sensitivity to light but this is restricted to a short range of wavelengths in the ultravoilet and/or blue regions of the spectrum. The effect of incorporating a sensitizing dye is to impart to the emulsion sensitivity to light of the other wavelengths. It has been known for some years that by incorporating in the emulsion together with a sensitizing dye, a second substance which may or may not itself by a sensitizer, there may sometimes be imparted to the emulsion an additional sensitivity beyond that which can be regarded as the sum effect of the separate substances. Combinations of a sensitizing dye and another substance which give this latter result are known as supersensitizing combinations. In British Pat. No. 1,027,053 there is described such a supersensitizing combination, the combination in this case being a thia or selenazoletrimethin cyanine dye of a closely defined formula with an oxathiatrimethin cyanine dye of a closely defined formula. It has now been discovered that an even greater sensitivity can be obtained by a supersensitizing combination which comprises a thia or selenazoletrimethin cyanine dye of the formula given in British Pat. No. 1,027,053 which has at least one thienyl substituent.

According to a first feature of the present invention there is provided a photographic silver halide emulsion containing no color forming materials which contains a supersensitizing combination which comprises a dye of the general formula I:

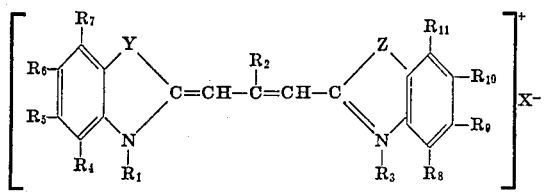

where Y represents sulfur or selenium atom. Z represents a sulfur or selenium atom, $R_1$ and $R_3$ are the same or different and are alkyl groups or one is an alkyl group and the other is a carboxyalkyl, carbamoyalkyl or sulfoalkyl group, $R_2$ is a hydrogen atom or alkyl group, $R_6$ and $R_{10}$ are the same or different and each represents a hydrogen or halogen atom, or an alkyl aryl hydroxy or alkoxy or alkoxy group. $R_4$ and $R_8$ are the same or different and each represents a hydrogen atom, at least one of $R_5$ and $R_9$ is a thienyl substituent group, when only one of $R_5$ and $R_9$ is a thienyl group the other is a hydrogen or halogen atom, or an alkyl, aryl, hydroxy or alkoxy group, or, can together with either $R_4$ or $R_8$, depending on whether $R_5$ or $R_9$ carries the thienyl substituent group, form part of a benzene ring, $R_7$ and $R_{11}$ are the same or different and each represents a hydrogen atom, or together with $R_6$ and $R_{10}$ form part of a benzene ring, and X is an anion, together with a dye of the general formula II:

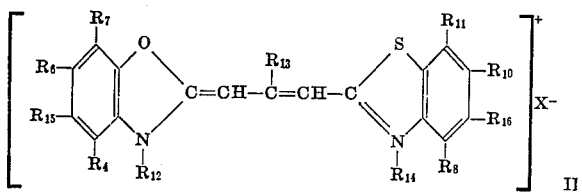

where $R_4$, $R_6$, $R_7$, $R_8$, $R_{10}$, $R_{11}$, and X have the meanings assigned to them above $R_{12}$ is an alkyl group, $R_{13}$ is a hydrogen atom or an alkyl group, $R_{14}$ is an alkyl group or a group A–Q where A is a straight or branched alkylene chain containing 1–6 carbon atoms and Q is an amide, carboxylic acid or sulfonic acid, and $R_{15}$ and $R_{16}$ are the same or different and each represents a hydrogen or halogen atom or an alkyl, aryl, alkoxy or hydroxy group.

Where Q is a sulfonic acid the dye generally exists in the anhydro form where X is a hydroxy ion.

In a preferred embodiment of the invention Q in formula II is a sulfonic acid group.

Referring to the general formula I and II it is to be noted that where alkyl groups are referred to these are preferably lower alkyl groups, i.e., containing 1–4 carbon atoms, though they may be higher alkyl groups, where aryl groups are referred to these may be phenyl or naphthyl and may include substituent groups such as alkyl groups or halogen atoms which do not destroy the sensitizing action of the compounds. The symbol X represents an anion and may be different in the different classes of compounds but generally will be a halide ion, or a sulfate, sulfonate, aryl sulfonate or perchlorate ion.

By the use of a combination of dyes as just set forth a valuable supersensitizing effect is obtained as illustrated by the specific examples which are set forth later herein.

It has been discovered that an even greater supersensitizing effect can be obtained and according to a second feature of the present invention there is provided a photographic silver halide emulsion which contains a supersensitizing combination which comprises a dye of the general formula I as defined above, a dye of the general formula II as defined above or either another dye of the general formula I as defined above or a dye of the general formula III:

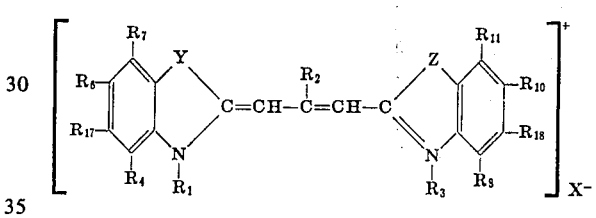

wherein $R_1$, $R_2$, $R_3$, $R_4$, $R_6$, $R_7$, $R_8$, $R_{10}$, $R_{11}$ and X,Y and Z have the meanings assigned to them above and $R_{17}$ and $R_{18}$ are the same or different and each represents a hydrogen or halogen atom or an alkyl, aryl, hydroxy or alkoxy group, or a dye of the general formula IV:

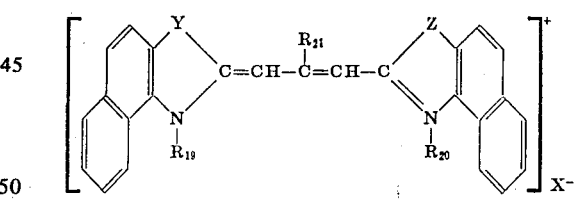

where $R_{19}$ and $R_{20}$ are alkyl and $R_{21}$ is a hydrogen atom or an alkyl group and where Y and Z are sulfur or selenium atoms and X is an anion.

By the use of this combination of three dyes as just set forth even better supersensitizing effect is obtained as illustrated by the following specific examples in which the following dyes were used:

Dyes of Formula I

A. Anhydro-(3-4'-sulfobutyl-5-2'-thienyl-2-benzothiazole)(5-chloro-3-ethyl-2-benzothiazole) β-ethyltrimethincyanine hydroxide.

B. Anhydro-(3-4'-sulfobutyl-5-2'-thienyl-2-benzothiazole)(3-ethyl-5-methyl-2-benzoselenazole β-ethyltrimethincyanine hydroxide.

C. Anhydro-(5-ethoxy-3-3'sulfopropyl-2-benzolthiazole)(3-ethyl-5-2'-thienyl-3-benzothiazole) β-ethyltrimethincyanine hydroxide.

D. Anhydro-(3-4'-sulfobutyl-5-2'-thienyl-2-benzothiazole)(3-ethyl-5,6-dimethyl-2-benzothiazole) β-ethyltrimethincyanine hydroxide.

E. Anhydro-(5-methyl-3-3'-sulfopropyl-2-benzothiazole)(3-ethyl-5-2'-thienyl-2-benzothiazole) β-ethyltrimethincyanine hydroxide.

F. Bis-(3-ethyl-5-2'-thienyl-2-benzothiazole) β-ethyltrimethincyanine bromide.

Dyes of Formula II

G. Anhydro-(3-3'-sulfopropyl-2-benzothiazole)(5-methoxy-3-methyl-2-benzoxazole) β-ethyltrimethincyanine hydroxide.

H. Anhydro-(3-3'-sulfopropyl-2-benzothiazole)(5-ethyl-5-phenyl-2-benzoxazole) β-ethyltrimethincyanine hydroxide.

Dyes of Formula III

J. Bis-(3-ethyl-5-methyl-2-benzothiazole) β-ethyltrimethincyanine iodide.

Dyes of Formula IV

K. Bis-1-ethyl-2-naphto[1,2d9 thiazole) β-ethyltrimethincyanine chloride.

L. Bis-(1-ethyl-2-naphtho [1,2d] thiazole) β-methyltrimethincyanine chloride.

EXAMPLE 1

Dyes, A, G and J were used, the method of testing being as in British Pat. No. 1,027,053 and 1,066,070, except that Dye J was added to the emulsion before digestion, the other two dyes after digestion.

| Dye A | Dye G | Dye J | Relative log speed |
| --- | --- | --- | --- |
| 0.035 g. | — | — | 3.95 |
| — | 0.18 | — | 4.30 |
| 0.035 g. | 0.18 | — | 4.52 |
| 0.020 g. | 0.20 | 0.15 | 4.76 |

The results show that a mixture of dyes A and G gives a higher red speed that either dye alone, also that an even higher speed is attainable by the addition of a third dye J.

The following Example 2 was obtained similarly using dye B in place of dye A.

EXAMPLE 2

| Dye B | Dye G | Dye J | Relative log speed |
| --- | --- | --- | --- |
| 0.035 g. | — | — | 4.47 |
| — | 0.20 | — | 4.51 |
| 0.035 g. | 0.20 | — | 4.84 |
| 0.020 g. | 0.20 | 0.015 | 4.92 |

In the following Examples 3 and 4, all three dyes were in each case added after digestion:

EXAMPLE 3

| Dye C | Dye G | Dye K | Relative log speed |
| --- | --- | --- | --- |
| 0.02 g. | — | — | 4.39 |
| — | 0.20 | — | 4.58 |
| 0.02 g. | 0.20 | — | 4.89 |
| 0.02 g. | 0.20 | 0.015 | 5.00 |

EXAMPLE 4

| Dye D | Dye G | Dye L | Relative Log speed. |
| --- | --- | --- | --- |
| 0.02 g. | — | — | 4.06 |
| — | 0.20 | —0.20 | 4.60 |
| 0.02 g. | 0.20 | — | 4.76 |
| 0.02 g. | 0.20 | 0.015 | 4.89 |

EXAMPLE 5

In this Example, the dye F was added before digestion, dyes E and H after digestion:

| Dye E | Dye F | Dye H | Relative log speed |
| --- | --- | --- | --- |
| 0.02 g. | — | — | 4.28 |
| — | — | 0.15 | 4.03 |
| 0.02 g. | — | 0.15 | 4.61 |
| — | 0.015 | — | 3.97 |
| — | 0.015 | 0.15 | 4.34 |
| 0.02 g. | 0.015 | 0.15 | 4.75 |

The results show that a mixture of dyes E and H gives a higher red speed than either dye alone, and that a mixture of dyes F and H likewise gives a higher red speed than either dye alone. They also show that an even higher speed is attainable by the use of a mixture of all three dyes.

We claim:

1. A photographic silver halide emulsion containing no color-forming materials which contains a supersensitizing combination which comprises a dye of the formula:

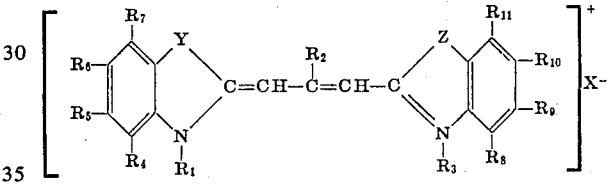

where Y and Z are selected from the class consisting of sulfur and selenium, at least one of the Groups $R_1$ and $R_3$ are alkyl, the other groups being selected from the class consisting of alkyl, carboxyalkyl, carbamoylalkyl and sulfoalkyl, $R_2$ is selected from the class consisting of hydrogen and alkyl, at least one of the groups $R_5$ and $R_9$ is a thienyl group, the other groups $R_5$ and $R_9$ being selected from the class consisting of hydrogen, halogen, alkyl, aryl, hydroxy and alkoxy groups and together with either $R_4$ or $R_8$ depending on whether $R_5$ or $R_9$ carries the thienyl substituent group from part of a benzene ring, $R_4$ and $R_8$ taken separately each represent a hydroxy atom, $R_6$ and $R_{10}$ taken separately are each selected from the class consisting of a hydrogen atom, a halogen atom, an alkyl, aryl, hydroxy and alkoxy groups, $R_7$ and $R_{11}$ taken separately each represent a hydrogen atom, $R_6$ and $R_7$ taken together from part of a benzene ring, $R_{10}$ and $R_{11}$ taken together form part of a benzene ring and X is an anion, together with a dye of the formula:

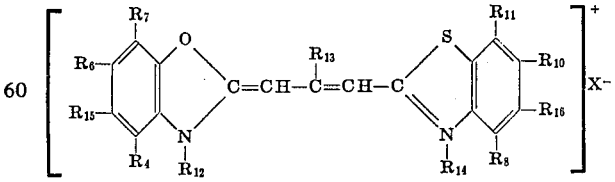

where $R_4$, $R_6$, $R_7$, $R_8$, $R_{10}$, $R_{11}$ and X have the meanings assigned to them above, $R_{12}$ is an alkyl group, $R_{13}$ is selected from the class consisting of hydrogen and alkyl, $R_{14}$ is selected from the class consisting of an alkyl group and a group A–Q where A is selected from the class consisting of straight and branched alkylene chains containing 1 to 6 carbon atoms and Q is selected from the class consisting of an amide, a carbonyl, and a sulfonic acid group and $R_{15}$ and $R_{16}$ are each selected from the class consisting of hydrogen, halogen, alkyl, aryl, alkoxy and hydroxy groups.

2. A photographic silver halide emulsion according to claim 1 wherein $R_{14}$ in the second formula set forth therein contains a sulfonic acid group and the dye is in the anhydro form where X is an hydroxide ion.

3. A photographic silver halide emulsion according to claim 1 which comprises anhydro-(3-4'-sulfobutyl-5-2'-thienyl-2-benzothiazole)(5-chloro-3-ethyl-2-benzothiazole) β-ethyltrimethincyanine hydroxide, and anhydro-(3-3'-sulfopropyl-2-benzothiazole)(5-methoxy-3-methyl-2-benzoxazole) β-ethyltrimethincyanine hydroxide.

4. A photographic silver halide emulsion according to claim 1 which comprises anhydro-(3-4'-sulfobutyl-5-2'-thienyl-2-benzothiazole)(3-ethyl-5-methyl-2-benzoselenazole) β-ethyltrimethincyanine hydroxide, and anhydro-(3-3'-sulfopropyl-2-benzothiazole)(5-methoxy-3-methyl-2-benzoxazole) β-ethyltrimethincyanine hydroxide.

5. A photographic silver halide emulsion according to claim 1 which comprises anhydro-(5-methyl-3-3'-sulfopropyl-2-benzothiazole)(3-ethyl-5-2'-thienyl-2-benzothiazole) β-ethyltrimethincyanine hydroxide, and anhydro-(3-3'-sulfopropyl-2-benzothiazole)(3-ethyl-5-phenyl-2-benzoxazole) β-ethyltrimethincyanine hydroxide.

6. A photographic material which comprises a support and at least one silver halide emulsion layer as defined in claim 1.

7. A photographic silver halide emulsion, containing no color formers, which contains a super-sensitizing combination which comprises a dye of the formula:

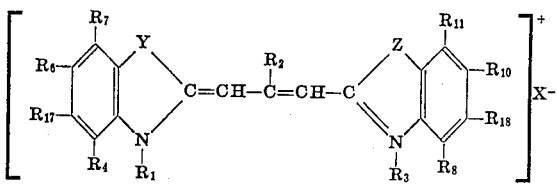

where Y and Z are selected from the class consisting of sulfur and selenium, at least one of the groups $R_1$ and $R_3$ are alkyl, the other group being selected from the class consisting of alkyl, carboxyalkyl, carbamoylalkyl and sulphoalkyl, $R_2$ is selected from the class consisting of hydrogen and alkyl, at least one of the groups $R_5$ and $R_9$ is a thienyl group, the other of groups $R_5$ and $R_9$ being selected from the class consisting of hydrogen, halogen, alkyl, aryl, hydroxy and alkoxy groups and together with either $R_4$ or $R_8$ depending on whether $R_5$ or $R_9$ carries the thienyl substituent group form part of a benzene ring, $R_4$ and $R_8$ taken separately each represent a hydrogen atom, $R_6$ and $R_{10}$ taken separately are each selected from the class consisting of a hydrogen atom, a halogen atom, an alkyl, aryl, hydroxy and alkoxy groups, $R_7$ and $R_{11}$ taken separately each represent a hydrogen atom, $R_6$ and $R_7$ taken together form part of a benzene ring, $R_{10}$ and $R_{11}$ taken together from part of a benzene ring and X is an anion, together with a dye of the formula:

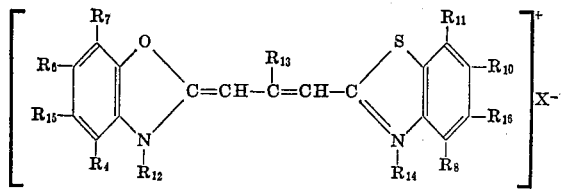

where $R_4$, $R_6$, $R_7$, $R_8$, $R_{10}$, $R_{11}$, and X have the meanings assigned to them above, $R_{12}$ is an alkyl group, $R_{13}$ is selected from the class consisting of hydrogen and alkyl, $R_{14}$ is selected from the class consisting of an alkyl group and a group A–Q where A is selected from the class consisting of straight and branched alkylene chains containing 1 to 6 carbon atoms and Q is selected from the class consisting of an amide, a carbonyl, and a sulfonic acid group and $R_{15}$ and $R_{16}$ are each selected from the class consisting of hydrogen, halogen, alkyl, aryl, alkoxy and hydroxy groups and, in addition, a dye selected from the class consisting of another dye of the formula first set above, a dye of the formula:

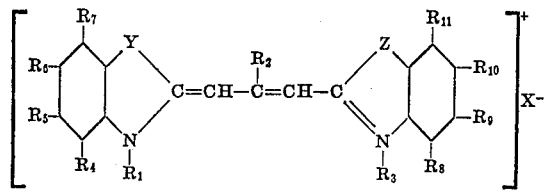

where $R_1$, $R_2$, $R_3$, $R_4$, $R_6$, $R_7$, $R_8$, $R_{10}$, $R_{11}$, X, Y and Z have the meanings assigned to them above, $R_{17}$ and $R_{18}$ are each selected from the class consisting of a hydrogen atom, a halogen atom, an alkyl, aryl, hydroxy and alkoxy group, and a dye of the formula:

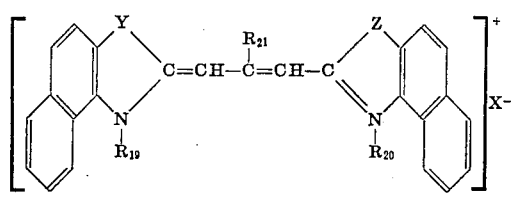

where $R_{19}$ and $R_{20}$ are each alkyl groups and $R_{21}$ is selected from the class consisting of a hydrogen atom and an alkyl group and X, Y AND Z have the meanings assigned to them above.

8. A photographic silver halide emulsion according to claim 7 wherein $R_{14}$ in the second formula set forth therein contains a sulfonic acid group and the dye is in the anhydro form where X is an hydroxide ion.

9. A photographic silver halide emulsion according to claim 7 which comprises anhydro-(3-4'-sulfobutyl-5-2'-thienyl-2-benzothiazole)(5-chloro-3-ethyl-2-benzothiazole) β-ethyltrimethincyanine hydroxide, anhydro-(3-3'-sulfopropyl-2-benzothiazole)(5-methoxy-3-methyl-2-benzoxazole) β-ethyltrimethincyanine hydroxide, and bis-(3-ethyl-5-methyl-2-benzothiazole) β-ethyltrimethincyanine iodide.

10. A photographic silver halide emulsion according to claim 7 which comprises anhydro-(3-4'-sulfobutyl-5-2'-thienyl-2benzothiazole)(3-ethyl-5-methyl-2-benzoselenazole) β-ethyltrimethincyanine hydroxide, anhydro-(3-3'-sulfopropyl-2-benzothiazole)(5-methoxy-3-methyl-2-benzoxazole) β-ethyltrimethincyanine hydroxide, and bis-(3-ethyl-5-methyl-2-benzothiazole) β-ethyltrimethincyanine iodide.

11. A photographic silver halide emulsion according to claim 7 which comprises anhydro-(5-methyl-3-3'-sulfopropyl-2-benzothiazole)(3-ethyl-5-2'-thienyl-2-benzothiazole) β-ethyltrimethincyanine hydroxide, bis-(3-ethyl-5-2'-thienyl-2-benzothiazole) β-ethyltrimethincyanine bromide, and anhydro-(3-3'-sulfopropyl-2-benzothiazole)(3-ethyl-5-phenyl-2-benzoxazole) β-ethyltrimethincyanine hydroxide.

12. Photographic material which comprises a support and at least one silver halide emulsion layer as defined in claim 7.

* * * * *